(12) United States Patent
Lam et al.

(10) Patent No.: US 11,479,284 B2
(45) Date of Patent: Oct. 25, 2022

(54) SYSTEM AND METHOD FOR AUTOMATED SHOPPING CART RETRIEVAL

(71) Applicant: Toshiba TEC Kabushiki Kaisha, Shinagawa-ku (JP)

(72) Inventors: Huu Lam, Temple City, CA (US); Jeffrey Wong, Aliso Viejo, CA (US)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 43 days.

(21) Appl. No.: 17/082,316

(22) Filed: Oct. 28, 2020

(65) Prior Publication Data

US 2022/0126901 A1  Apr. 28, 2022

(51) Int. Cl.
*B62B 3/14* (2006.01)
*G05D 1/00* (2006.01)
*G05D 1/02* (2020.01)

(52) U.S. Cl.
CPC ......... *B62B 3/1404* (2013.01); *G05D 1/0022* (2013.01); *G05D 1/028* (2013.01); *G05D 1/0212* (2013.01); *G05D 1/0231* (2013.01)

(58) Field of Classification Search
CPC .. B62B 3/1404; G05D 1/0022; G05D 1/0212; G05D 1/0231; G05D 1/028
See application file for complete search history.

(56) References Cited

U.S. PATENT DOCUMENTS

| | | | |
|---|---|---|---|
| 2016/0023675 A1* | 1/2016 | Hannah | G05D 1/0022 701/2 |
| 2021/0147202 A1* | 5/2021 | Black | B62B 5/0079 |

* cited by examiner

*Primary Examiner* — Faris S Almatrahi
*Assistant Examiner* — Abdalla A Khaled
(74) *Attorney, Agent, or Firm* — Ulmer & Berne LLP; John X. Garred

(57) ABSTRACT

A system and method for automated return of shopping carts includes a motorized, remotely controllable push cart affixed to a back end of a row of nested shopping carts. An intelligent navigational lead cart is placed at a front end of the shopping carts. The lead cart enables operation of the push cart and steers the nested shopping carts to a desired location.

20 Claims, 3 Drawing Sheets

SYSTEM AND METHOD FOR AUTOMATED SHOPPING CART RETRIEVAL

TECHNICAL FIELD

This application relates generally to automated retrieval of shopping carts from areas such as parking lots.

BACKGROUND

Shopping carts are ubiquitous in retail establishments such as grocery stores, department stores, and hardware stores. Consumers will typically pick up a cart positioned nearby a retail premises entrance. They place items in the cart as they shop, and ultimately take their selections to a point-of-sale terminal for payment. Many times purchased items are returned to the cart which is then used to transport the items to consumers' vehicles.

Early on, consumers would simply leave their emptied cart next to their car and drive off. This was extremely problematic for several reasons. Carts could move, such as when positioned on a slope or pushed by wind. Moving carts provide a hazard to drivers and have significant risk of contacting and damaging parked cars. Stores would therefore provide staff members to retrieve carts from the parking lot. Most shopping carts today are nest-able. That is to say, the carts are sized and constructed to push in to one another in a chain-like fashion. This allows for space saving while carts are being stored or transported. Additionally, one person could track down and nest multiple carts, moving all of them at once back to the store for reuse.

BRIEF DESCRIPTION OF THE DRAWINGS

Various embodiments will become better understood with regard to the following description, appended claims and accompanying drawings wherein:

DETAILED DESCRIPTION

Figure 1:
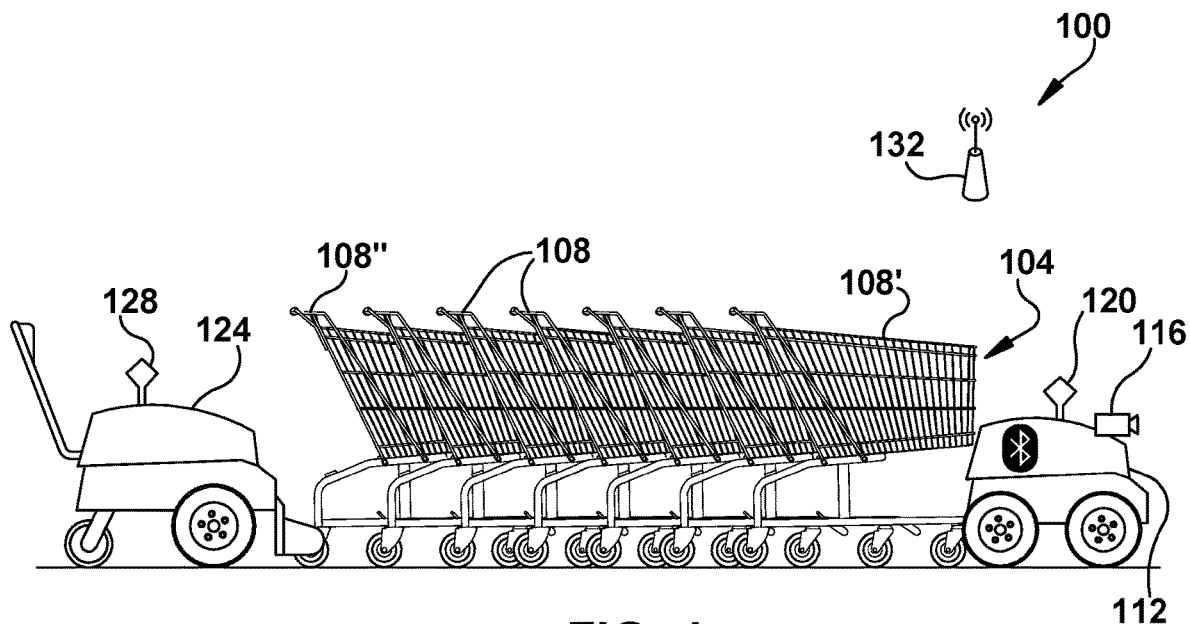
FIG. 1 is an example embodiment of an automated shopping cart retrieval system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Retailers provide corrals in parking lots where consumers can safely leave their carts after unloading. Corrals can be constructed from metal rail and fencing, and may be sized to fit within one parking space. Corrals can be dispersed in a parking lot to provide a relatively close return point relative to their parked vehicles. While occasionally carts are still left scattered about a parking lot, retrieval is speeded up and damage or danger from loose carts is lessened. While this provided an improvement, employees are limited as to how many carts they can nest and transport during one trip.

A motorized solution provides a motor driven push cart placed at an end of a chain of nested carts. An employee nests a long line of carts and affixes the push cart to the rear. They employee goes to the front of the line and engages the push cart with a remote control. The employee manually directs the row of carts in a desired direction as they move by guiding the lead cart, and the push cart is turned off and removed once the carts are placed.

The forgoing still requires human interaction and control. Human resources are typically a business's biggest expense. Furthermore, employees may be uncomfortable working in extreme weather conditions to retrieve carts. At times, such as during thunderstorms, it can be dangerous to be outdoors due to high winds or risk of lightning strikes.

Example embodiments herein provide an automatic return cart system wherein carts that are returned by customers to a linear corral or cart storage area are automatically transported to a desired location. The system utilizes available navigation and autopilot technology to guide carts to a preselected location.

Example embodiments include a cart lane or coral where customers return their carts. The system employs a pushing cart at the back of a line of nest carts and a leading or navigational cart at the front. Any suitable motorized pushing cart that can be remote controlled can be used. By way of example, commercially available pushing carts, including those equipped for remote control, are manufactured by Dane Technologies, CDS, Inc. or Eagle Parts & Products, Inc.

An intelligent leading cart includes a navigation system to provide a route from one location to another. It also has includes an autopilot and sensor so as to predict and avoid collisions. The leading cart eliminates any need for human control. Example embodiments of a leading cart can be implemented from existing robotic navigation equipment, such as autonomous warehouse robots function as automated guided vehicles (AGVs). Suitable AGVs autonomously navigate by following established routes that are marked by wires, magnetic strips, tracks, embedded sensors in the floor or other physical guides. Other suitable AGVs utilize cameras, lidar, infrared and other advanced technology to navigate workspaces, identify obstacles and avoid collisions. Examples include products supplied by Prime Robotics, I AM Robotics or 6 River Systems.

Example embodiments herein include one or more electronic beacons, such as Bluetooth Low Energy (BLE) beacons that can broadcast data. Standard BLE beacons have an approximate range of 70 meters. Long range beacons can reach up to 450 meters. A beacon, or array of beacons, can provide directional information to a navigational cart. A known position associated with a beacon can direct the navigational cart to a particular location. In the event that a store has multiple entrances, and thus multiple cart storage areas, selectively or alternately enabling a beacon can direct cart placement in one of two or more locations. Navigation is also suitably accomplished with by triangulation between signals received from multiple sources, as well as by GPS information.

FIG. 1 is an example embodiment of an automated shopping cart return system 100 operable to return a row 104 of nested shopping carts 108. An intelligent lead or navigational cart 112 is coupled to a first cart 108' of row 104. Navigational cart 112 includes a digital video camera 116 and an antenna 120 for sending operational commands to a motorized, remote controllable push cart 124 via antenna 128. Push cart 124 is coupled to a last cart 108″ in row 104. When engaged, push cart 124 pushes all carts and navigational cart 112 to a desired location under navigational control of navigational cart 112. Navigational cart 112 is suitably enabled for wireless data communication, such as via a Bluetooth connection to Bluetooth access point or BLE beacon 132.

Figure 2:
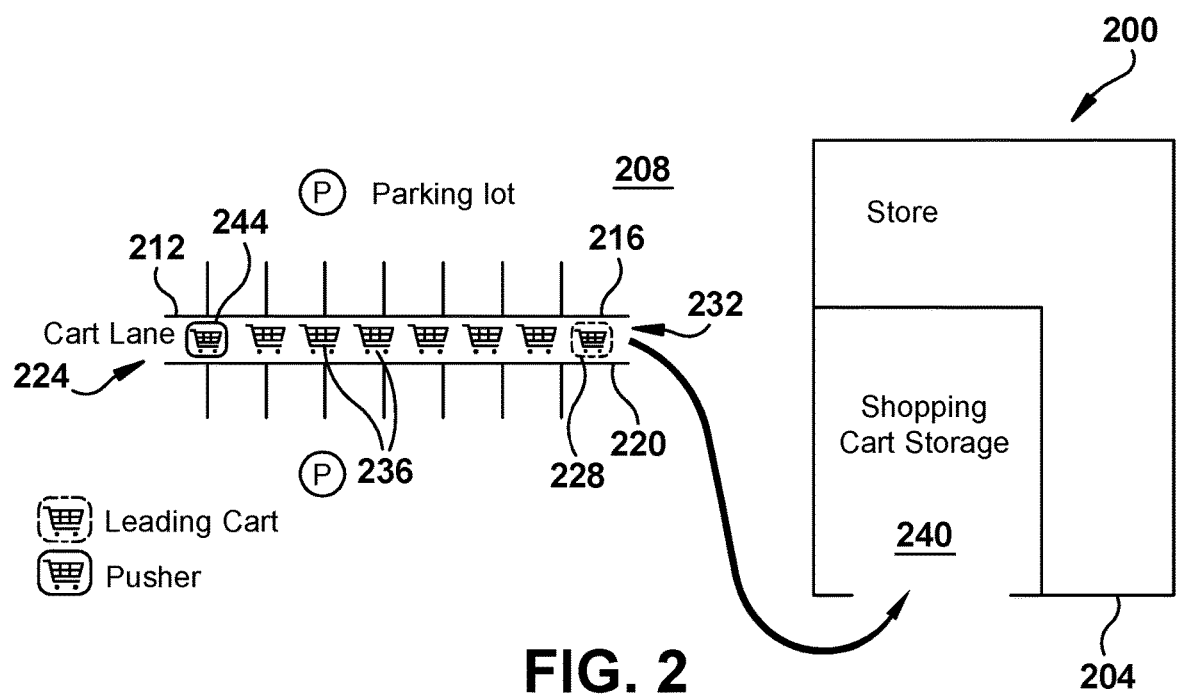
FIG. 2 is an example embodiment of a system for automated shopping cart retrieval.

FIG. 2 illustrates an example embodiment of an automated shopping cart return system 200 associated with retail store 204 that includes parking lot 208. Cart lane 212 is comprised of a linear, open ended coral, suitably comprised of parallel railings 216 and 220. The railings 216, 220 are spaced apart such that carts are linearly aligned as they are returned by customers in coral opening 224. A lead or navigational cart 228 is positioned at a forward end 232 of cart lane 212. When carts 236 are to be relocated to shopping cart storage location 240, pushing cart 244 is positioned behind the carts 236 at opening 224. Pushing cart 224 is wirelessly activated by navigational cart 228, serving to nest carts 236 within one another to the extent this has not been done by a customer. Once nesting is done, navigational cart 228 will begin to move due to the force of pushing cart 244. Navigational cart 228 senses its environment and leads the line of nested carts 236 to storage area 240, suitably turning off pushing cart 244 upon arrival. Camera or other sensor inputs to navigational cart 228 allow for rerouting, stopping or starting the carts to avoid obstacles, such as pedestrians, vehicles or other carts.

Figure 3:
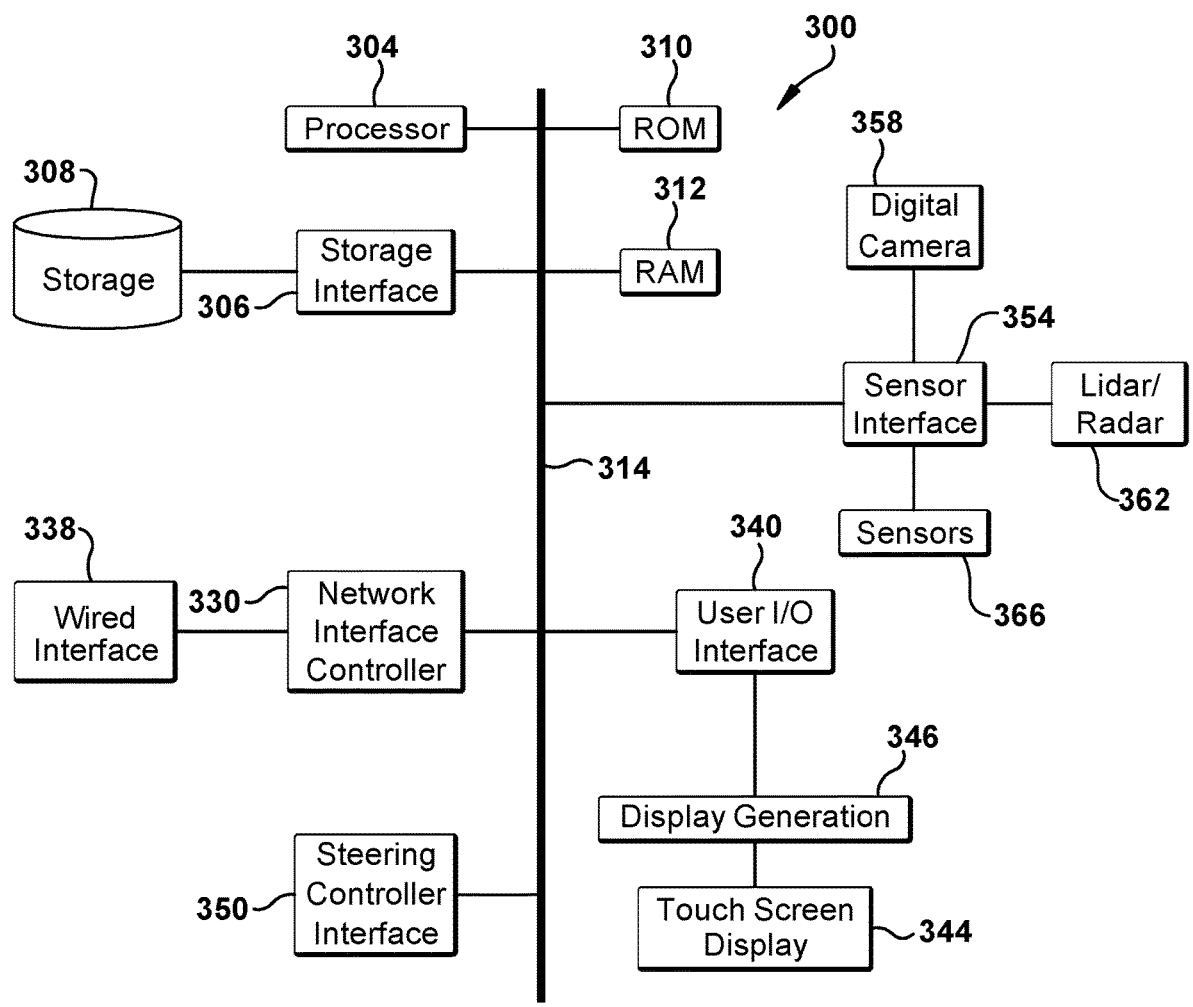
FIG. 3 is an example embodiment of an intelligent lead navigational cart.

Turning now to FIG. 3, illustrated is an example of a digital device system suitably comprising function components of a lead or navigational cart, such as navigational cart 112 of FIG. 1 and navigational cart 228 of FIG. 2. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless network interface 338. A suitable data connection to pusher cart is via direct wireless data communication. A digital data connection is suitably via a wireless or remote control protocol, such as via Bluetooth, optical data transfer, Wi-Fi direct, or the like.

Processor 304 is also in data communication with a user input/output (I/O) interface 340 which provides data communication with user peripherals, such as touch screen display 344 via display generator 346, as well as keyboards, mice, track balls, touch screens, or the like. It will be understood that functional units are suitably comprised of intelligent units, including any suitable hardware or software platform. Also in data communication with processor 304 is a steering control interface 350 for positioning of navigational cart wheels to direct a line of nested shopping carts to a desired location. Environmental awareness for navigation is provided via sensor interface 354, suitably implementing input from devices such as digital camera 358, radar or lidar 362, or any other suitable sensor 366.

Figure 4:
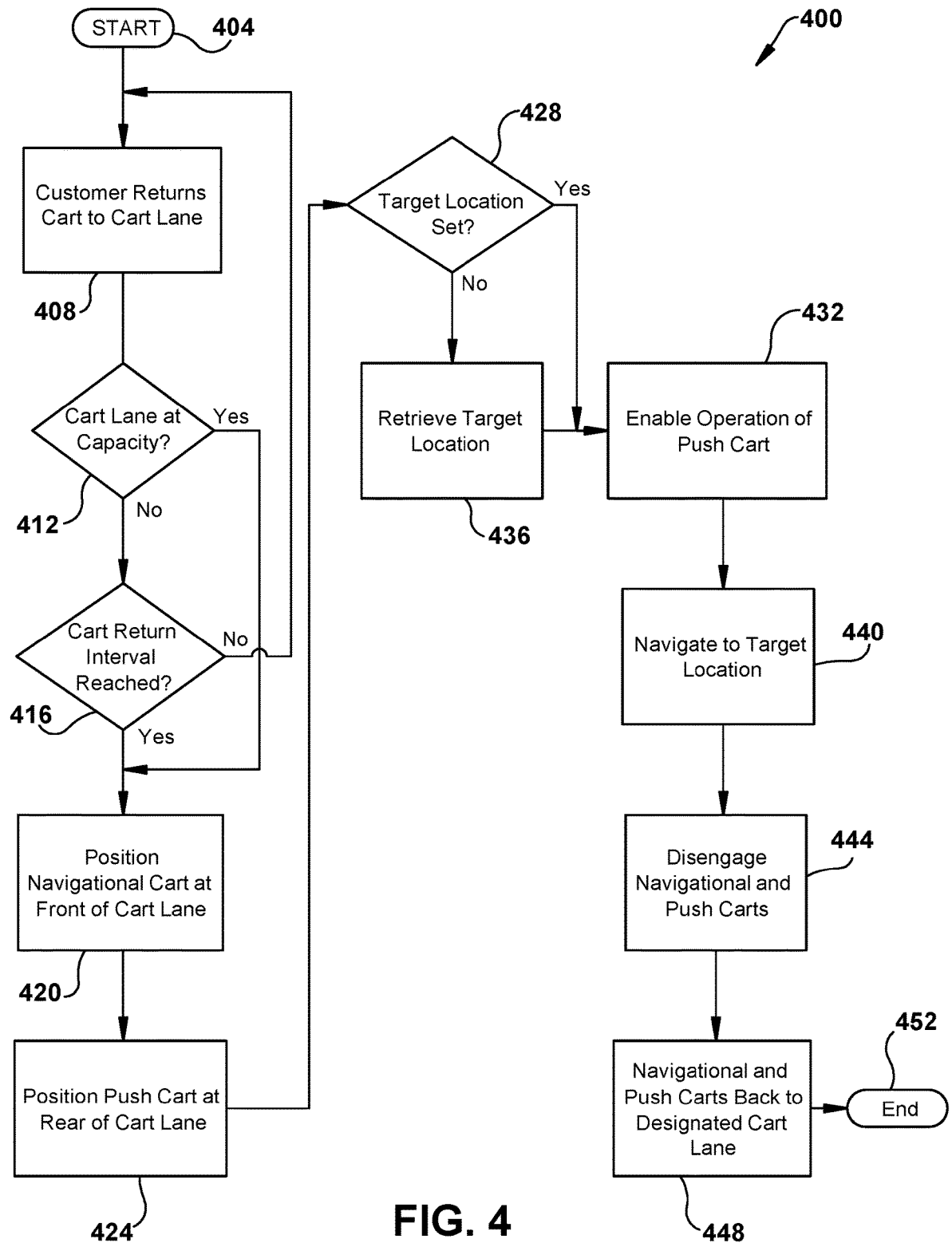
FIG. 4 is a flowchart of an example embodiment of an automated shopping cart return system.

FIG. 4 is a flowchart 400 of an example embodiment of an automated shopping cart retrieval system. The process commences at block 404, and proceeds to block 408 where a customer returns their cart to a cart lane, suitably comprised of linear corral, the width of which promotes nesting of carts as they are pushed from behind. Next at block 412, a check is made as to whether the cart lane is at capacity. If not, a check is made at block 416 to determine whether a return interval is reached. If a cart lane is neither full nor a return interval reached, the system returns to block 408 for receipt of another cart into the cart lane.

If a cart lane is full or if a return interval reached, the system proceeds to block 420 where a navigational cart is positioned to contact a first cart in the cart lane. In one example, the navigational cart is positioned first in an empty, or near empty corral and a first cart in a linear array of nested carts can be latched onto it when contact is made. The navigational cart may also navigate to a populated corral and position itself so as to contact a first cart when needed. In another example, the navigational cart may be provided with a braking mechanism to prevent cart movement when being pushed from behind. This can aid in situations where nesting is incomplete and where completion of nesting occurs by operation of a push cart.

Next, at block 424, a push cart is positioned to contact a last cart in the cart lane for pushing. A push cart may be manually positioned, or may include autonomous navigation similar to what the navigational cart uses to position itself. If the navigational cart is set for a target location as determined at block 428, the process progresses to block 432 wherein the push cart is enabled. If no target is present or if a new one required, target information is obtained at block 436, suitably wirelessly such as via Bluetooth data connection. The navigational cart directs the line of nested shopping carts to a target location at block 440. Once the target location is reached, both the push cart and the navigation cart are disengaged from the line of nested carts at block 444, and they return to a designated cart lane for another retrieval operation at block 448. The process suitably ends at block 452 or returns to block 408 for another retrieval session.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. An automated shopping cart retrieval system comprising:
   an autonomous cart pusher configured to push a plurality of aligned, nested shopping carts, the autonomous cart pusher including an associated
   autonomous cart pusher processor,
   autonomous cart pusher memory,
   one or more steerable wheels controllable by the autonomous cart pusher processor,
   an autonomous cart pusher position sensor,
   radio frequency receiver configured to receive operational instructions from an associated autonomous navigational cart, and a powered drive motor controllable by the operational instructions received from the autonomous navigational cart, and further controllable to locate and contact a first end of nested shopping carts; and the autonomous navigational cart configured to be pushed from a lead cart of the plurality of aligned, nested shopping carts, the autonomous navigational cart including an associated autonomous navigational cart processor, memory, one or more steerable wheels controllable by the autonomous navigational cart processor, an autonomous navigational cart position sensor, radio frequency transmitter, and a powered drive motor controllable to locate and contact a second end of the nested shopping carts, wherein the autonomous navigational cart processor is configured to send the operational instructions to the autonomous cart pusher via the radio frequency transmitter to commence a pushing operation or stop the pushing operation, and wherein the autonomous navigational cart processor is further configured to direct the aligned, nested shopping carts to a predefined location while being pushed by the autonomous cart pusher in accordance with an output of the associated position sensor by controlling the one or more steerable wheels.

2. The system of claim 1 wherein one or more of the autonomous pusher cart position sensor and the autonomous navigational cart position sensor is comprised of a digital camera.

3. The system of claim 2 wherein the autonomous navigational cart processor is further configured to adjust a route to the predefined location in accordance with objects detected from images captured from the digital camera.

4. The system of claim 3 wherein the autonomous cart pusher is further configured to nest one or more of the shopping carts to form the plurality of aligned, nested shopping carts.

5. The system of claim 3 wherein the autonomous navigational cart includes a Bluetooth interface configured to receive beacon data from an associated Bluetooth beacon, and wherein the autonomous navigational cart processor is further configured to direct the shopping carts to the predefined location in accordance with the received beacon data.

6. The system of claim 1 wherein the autonomous navigational cart processor is further configured to send the operational instructions to the autonomous cart pusher at predefined intervals.

7. The system of claim 1 wherein the autonomous navigational cart processor is further configured to send the operational instructions to the autonomous cart pusher when a preselected number of shopping carts is in the plurality of aligned, nested shopping carts.

8. A method for automated shopping cart retrieval comprising:

autonomously engaging a lead cart of a plurality of aligned, nested carts to a navigational cart;

autonomously engaging a last cart of the aligned, nested carts to a push cart;

sending operational instructions from the navigational cart to the push cart to commence a pushing operation;

sensing a position of the lead cart as it is pushed by the last cart of the aligned, nested shopping carts; and autonomously directing the aligned, nested shopping carts to a predefined location in accordance with the sensed position by controlling one or more wheels on the navigational cart.

9. The method of claim 8 further comprising capturing digital images via a digital camera associated with the navigational cart and sensing the position of the lead cart in accordance with captured digital images.

10. The method of claim 9 further comprising adjusting a route to the predefined location in accordance with objects detected from the digital images captured from the digital camera.

11. The method of claim 10 further comprising nesting one or more of the shopping carts to form the plurality of aligned, nested shopping carts.

12. The method of claim 10 further comprising receiving beacon data from an associated Bluetooth beacon, and directing the aligned, nested shopping carts to the predefined location in accordance with the received beacon data.

13. The method of claim 8 further comprising sending the operational instructions to the push cart at predefined intervals.

14. The method of claim 8 further comprising sending the operational instructions to the push cart when a preselected number of shopping carts is in the plurality of aligned, nested shopping carts.

15. A method for automated shopping cart retrieval comprising:

receiving a plurality of shopping carts into a linear corral configured to align the plurality of shopping carts for nesting;

autonomously engaging a lead cart of a plurality of linearly aligned carts to navigational cart;

autonomously engaging a last cart of the linearly aligned carts in the corral to a push cart;

sending operational instructions from the navigational cart to the push cart to commence a pushing operation;

receiving the operational instructions by the push cart;

pushing the linearly aligned carts via the push cart responsive to the received operational instructions;

sensing a position of the lead cart as it is pushed by the last cart of the linearly aligned carts; and directing the linearly aligned carts to a predefined location in accordance with a sensed operation by controlling wheels on the navigational cart.

16. The method of claim 15 further comprising nesting the linearly aligned carts in accordance with pushing via the push cart.

17. The method of claim 15 further comprising positioning the navigational cart at an exit of the linear corral prior to receiving the plurality of shopping carts into the linear corral.

18. The method of claim 17 further comprising engaging the last cart to the push cart in accordance with a preselected duration.

19. The method of claim 17 further comprising monitoring a number of carts in the linear corral and engaging the last cart to the push cart when a monitored number achieves a preselected threshold level.

20. The method of claim 17 further comprising monitoring a length of the linearly aligned carts in the linear corral and engaging the last cart to the push cart when a monitored length achieves a preselected threshold level.

* * * * *